United States Patent [19]

Iwata

[11] 3,978,346

[45] Aug. 31, 1976

[54] HIGH DC VOLTAGE GENERATOR
[75] Inventor: Koji Iwata, Hitachi, Japan
[73] Assignee: Hitachi, Ltd., Japan
[22] Filed: Apr. 7, 1975
[21] Appl. No.: 565,374

[30] Foreign Application Priority Data
Apr. 9, 1974 Japan.............................. 49-40303

[52] U.S. Cl.................................. 307/51; 307/82; 307/87; 321/45 C; 315/160
[51] Int. Cl.² ...................... H02J 3/38; H02M 7/17
[58] Field of Search .................. 307/11, 12, 18, 24, 307/38, 51, 58, 72, 85, 86, 87; 315/111.5, 111.7, 160; 219/121 P; 321/2, 43, 44, 45 C, 47

[56] References Cited
UNITED STATES PATENTS

| | | | |
|---|---|---|---|
| 3,462,672 | 8/1969 | Knapp et al. | 321/43 |
| 3,566,186 | 2/1971 | Woolsey | 315/160 |
| 3,748,560 | 7/1973 | Sawa et al. | 321/45 C |

FOREIGN PATENTS OR APPLICATIONS

| | | | |
|---|---|---|---|
| 1,159,072 | 12/1963 | Germany | 321/45 C |

*Primary Examiner*—Gerald Goldberg
*Attorney, Agent, or Firm*—Craig & Antonelli

[57] ABSTRACT

A resistor is provided in parallel with a first coil. By suspending the supply of a DC current to the first coil while the DC current is flowing through the first coil, a high DC voltage is generated across the resistor and the high DC voltage is applied to a second coil to allow a fast-rise current to flow therethrough. Reverse current blocking means is provided between the first and second coils to prevent a DC current from flowing back via the first coil when the second coil is supplied with a DC current. Currents flowing through the first and second coils can be controlled independently.

6 Claims, 4 Drawing Figures

HIGH DC VOLTAGE GENERATOR

BACKGROUND OF THE INVENTION

1. Field of the Invention

This invention relates to a high DC voltage generator and particularly to a high DC voltage generator preferably with a nuclear fusion apparatus.

2. Description of the Prior Art

For example, for a high DC voltage generator to be used as a power supply for a nuclear fusion apparatus, it is necessary to generate a high DC voltage in the order of 100 times the initial service voltage in a short time by reducing the flow of a DC current supplied to a current transformer coil in an extremely short time compared with the time constant of the coil. Then, it is necessary to supply a circuit employing plasma as a conductor which is introduced into an evacuated container of ring-shape (hereinafter referred to as a plasma circuit) with a first-rise current through induction between the current transformer coil and the plasma circuit. For this purpose, there has been suggested an apparatus wherein while a current transformer is supplied with a DC current, the supply of the DC current flowing through the current transformer coil is shut off in a short time by a switching means to allow the DC current of the current transformer coil to flow via a resistor so that the DC current of the current transformer coil is so drastically reduced as to produce a high voltage in the transformer thereby to pass a fast-rise current into the plasma circuit.

Also, it is necessary to apply a magnetic field vertically to the plasma circuit in order to enclose the plasma generated in the plasma circuit stably without causing the plasma to emanate outwardly when the plasma circuit is supplied with a current. The coil for applying the vertical magnetic field must be supplied with a current in synchronism with that of the plasma circuit in order to enclose the plasma in good order. For this purpose, the vertical magnetic field coil must also be supplied with a fast-rise current. It is suggested, therefore, that the vertical magnetic field coil should be supplied with a fast-rise current by applying the high voltage developed across the resistor to the vertical magnetic field coil. After a fast-rise current has been supplied to the vertical magnetic field coil, the vertical magnetic field coil is further supplied with a DC current from another DC current supply device so that a current in synchronism with that of the plasma circuit flows continuously through the vertical magnetic field coil. But, if a current is allowed to flow through the vertical magnetic field coil while maintaining the connection between the current transformer coil and the vertical magnetic field coil, the current transformer coil is supplied with a current reverse to the current which has been flowing so far and the plasma circuit cannot be supplied with current satisfactorily. Therefore, after the vertical magnetic field coil is supplied with a fast-rise current, the vertical magnetic field coil must be controlled independently of the current transformer coil.

The foregoing requirements are applicable to any arrangement wherein a high voltage generated when the supply of a DC current to the first coil is suspended is applied to the second coil, a fast-rise current is supplied to the second coil, then another DC current is supplied to the second coil.

SUMMARY OF THE INVENTION

An object of this invention is to provide a high voltage generator wherein a high voltage obtainable by shutting off the current supplied to the first coil is applied to the second coil and then the second coil is supplied with a DC current from another power source, whereby currents flowing through the first and second coils can be independently controlled satisfactorily.

Another object of this invention is to provide a high voltage generator capable of utilizing switches of small current breaking capacity to control the currents through the first and second coils independently.

According to this invention, there is provided a high voltage generator comprising a first coil, a first DC current supply means for supplying the first coil with a DC current, a resistor connected in parallel with the first coil, a switching means for shutting off the DC current of the first coil while the DC current supplied to the first coil is flowing therethrough, a second coil supplied with a high voltage which is generated when the switching means has made a shut-off action, a second DC current supply means for supplying the second coil with another DC current after the high voltage has been applied to the second coil, and a reverse current blocking means provided between the first and second coils for preventing the DC current supplied by the second DC current supply means from flowing through the first coil.

DESCRIPTION OF THE PREFERRED EMBODIMENTS

Figure 1:
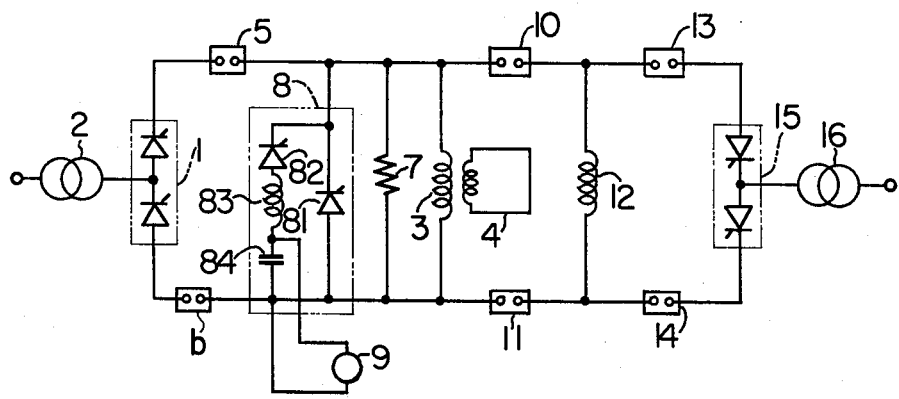
FIG. 1 is a circuit diagram of a high voltage generator for use in a nuclear fusion apparatus embodying the invention.

FIG. 1 shows a high voltage generator for the nuclear fusion apparatus embodying this invention. In the figure, an AC power is supplied via a transformer 2 for rectification to a first thyristor converter 1, which is so constructed as to convert the AC power into a DC power and supply it to a current transformer coil 3. A current transformer coil 3 is coupled electromagnetically with a plasma circuit 4. The plasma circuit 4 is formed by a plasma which is enclosed in a ring-shaped vacuum container. The current transformer coil 3 is supplied with the DC current via switches 5 and 6 from the first thyristor converter 1. A resistor 7 is connected in parallel with the current transformer coil 3. A switching means generally designated at 8 is provided in parallel with the current transformer coil 3 between a parallel connection of the current transformer coil 3 with the resistor 7 and the switches 5 and 6. The switching means 8 comprises a main thyristor 81, a series connection which includes a commutating thyristor 82, a reactor 83 and a capacitor 84 and which is connected in parallel with the main thyristor 81, and a DC power source 9 for charging the capacitor 84. A vertical magnetic field coil 12 is connected via DC breakers 10 and 11 to the current transformer coil 3, and a second thyristor converter 15 is connected via switches 13 and 14 to the vertical magnetic field coil 12. A second thyristor converter 15 is supplied with AC power via a transformer 16 for rectification, which converter converts the AC power into DC power and supplies it to the vertical magnetic field coil 12.

Figure 2:
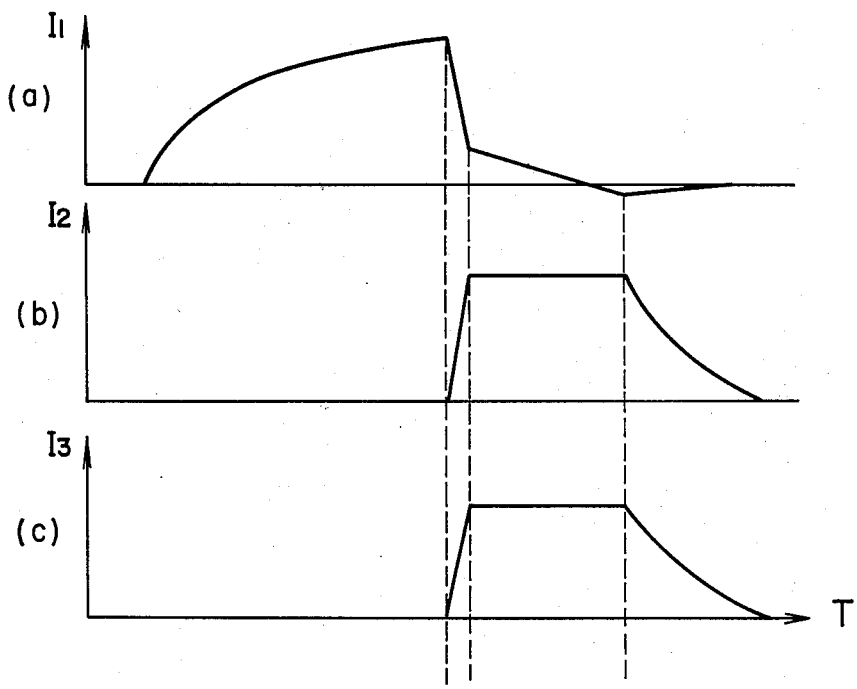
FIG. 2 is a waveform diagram for explaining the operation of the generator shown in FIG. 1.

The operation of a high voltage generator constructed as above will be described with reference to FIG. 2. FIGS. 2(a), (b) and (c) show the relations between time T and current $I_1$ of the current transformer coil 3, current $I_2$ of the plasma circuit 4 and current $I_3$ of the vertical magnetic field coil 12. The first thyristor converter 1 supplies a current to the current transformer coil 3 with the switches 5 and 6 closed, the switches 13 and 14 opened and the DC breakers 10 and 11 opened. In this case, the current is allowed to flow gradually through the current transformer coil 3 as shown in FIG. 2 (a), since the time constant of the current transformer coil 3 is as long as about five seconds. When the current through the current transformer coil 3 has reached a specified level, the main thyristor 81 is turned on by supplying it with a gate signal. Under this condition, the current from the first thyristor converter 1 is decreased gradually so that a circulating current flows via the current transformer coil 3 and the main thyristor 81. When the supply of current from the first thyristor converter 1 has stopped, the switches 5 and 6 are opened. Then, the DC breakers 10 and 11 are closed. After that, the gate signal of the main thyristor 81 is removed and the commutating thyristor 82 is supplied with a gate signal so that a series resonance circuit of the reactor 83 and the capacitor 84 causes a current to flow through the main thyristor 81 to cancel out the previous current which has been flowing therethrough, thereby turning off the main thyristor 81. As a result, the current of the current transformer coil 3 begins to flow via the resistor 7 and decreases drastically to generate a high voltage such as determined by the resistance of resistor 7. Consequently, an induced current is supplied to the plasma circuit 4 from the current transformer coil 3, as shown in FIG. 2 (b). On the other hand, the DC high voltage generated by resistor 7 is applied to the vertical magnetic field coil 12 and a fast-rise current is allowed to flow as in the case of the plasma circuit 4, as shown in FIG. 2 (c). When the current through the plasma circuit 4 has reached a specified level, the resistance of the resistor 7 is decreased to reduce the attenuation rate of the current through the current transformer coil 3 so that the current through the plasma circuit 4 is maintained at a specified level. At the same time, the switches 13 and 14 are closed and the vertical magnetic field coil 12 is supplied with a DC current from the second thyristor converter 15. On this occasion, the DC breakers 10 and 11 are interrupted to prevent the flow of the current from the second thyristor converter 15 to the current transformer coil 3 so that the current flowing through the current transformer coil 3 and vertical magnetic field coil 12 can be independently controlled, thus making it possible to enclose a plasma stably.

Figure 3:
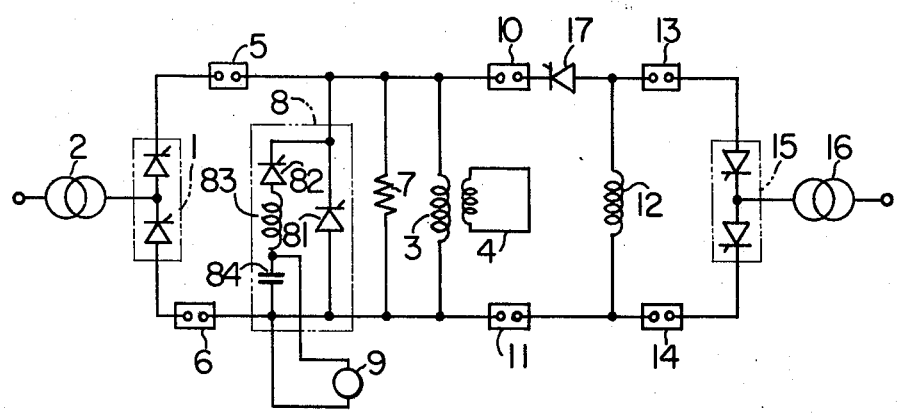
FIGS. 3 and 4 are circuit diagrams of other embodiments of a high voltage generator for use in a nuclear fusion apparatus according to the invention.

FIG. 3 shows another embodiment of this invention, wherein the same numerals as those in FIG. 1 represent the same or corresponding parts. The difference from the embodiment of FIG. 1 is that a diode 17 is provided in series with the DC breaker 10 between the current transformer coil 3 and the vertical magnetic field coil 12. The operation of this embodiment is similar to that of the embodiment of FIG. 1. More particularly, while the current transformer coil 3 is supplied with a DC current via the first thyristor converter 1, the DC current from the first thyristor converter 1 is brought to zero by applying an ignition signal to the main thyristor 81. Then, when the switches 5 and 6 are opened along with closure of the breakers 10 and 11 and opening of main thyristor 81 at a high speed, a high voltage controlled by the resistor 7 develops across the current transformer coil 3, thus supplying a fast-rise current to the vertical magnetic field coil 12. When the current flowing into vertical magnetic field coil 12 has reached a specified level, the switches 13 and 14 are closed and the vertical magnetic field coil 12 is supplied with current from the second thyristor converter 15. As a result, the current which has been supplied from the current transformer coil 3 is attenuated to zero by the action of diode 17. Therefore, the breakers 10 and 11 are opened after the current therethrough has been brought to zero. If a large amount of current flows through the DC breakers 10 and 11, the breakers 10 and 11 are required to be of an extremely large current capacity, resulting in high cost. However, the provision of diode 17 permits the breakers 10 and 11 to be opened after the current flowing therethrough has been brought to zero. Thus, the breakers 10 and 11 are not required to break current, and they may be replaced with ordinary switches having no breaking capacity. Therefore, the breakers 10 and 11 need low breaking current capacity and can be fabricated at low cost.

This embodiment employs the diode 17 connected in series with the breaker 10. The same result is obtained even if the diode 17 is connected in series with the breaker 11. In latter case, the diode 17 must be provided in such a manner that the anode of the diode 17 may be located at the current transformer coil side.

Figure 4:
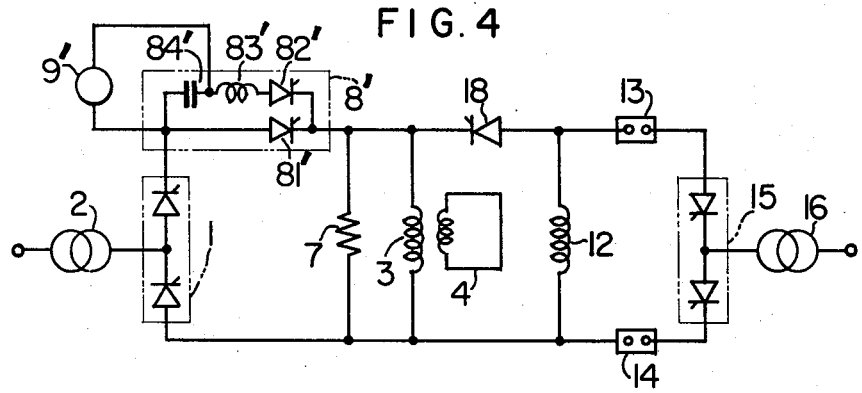

FIG. 4 shows another embodiment of this invention. The differences from FIG. 1 are that switching means generally designated at 8' is provided in series between the first thyristor converter 1 and the current transformer coil 3 and that a thyristor switch 18 in place of the breakers 10 and 11 is provided. In operation, while the current transformer coil 3 is supplied with a DC current from the first thyristor converter 1, a thyristor switch 18 is turned on, a gate signal of a main thyristor 81' is shut off, a commutating thyristor 82' is ignited by applying a signal to the gate thereof, and the resonance of a capacitor 84' and reactor 83' produces a current which cancels out and shuts off the current flowing through the main thyristor 81'. As a result, the current of the current transformer coil 3 begins to flow via the resistor 7 and a high DC voltage controlled by the resistance of the resistor 7 is generated. This high DC voltage is applied to the vertical magnetic field coil 12 and a fast-rise current is allowed to flow through the vertical magnetic field coil 12. When the current through the vertical magnetic field coil 12 has reached a specified level, the switches 13 and 14 are closed, a current is supplied from the second thyristor converter 15 and a gate signal of the thyristor switch 18 is shut off. In consequence, the current through the thyristor switch 18 decreases to zero at which the thyristor switch 18 becomes nonconductive. Thus, the currents through the current transformer coil 3 and the vertical magnetic field coil 12 can be independently controlled. The provision of thyristor switch 18 facilitates arrangement of the circuit.

Although, in the foregoing, the embodiments have been described in terms of a high DC voltage generator for a nuclear fusion apparatus, the invention is also applicable to an apparatus wherein there are provided first and second coils, and the first and second coils must be independently controlled after they have been supplied with fast-rise currents.

I claim:

1. A high DC voltage generator comprising a first coil, a first DC current supply means for supplying said first coil with a DC current, a resistor connected in parallel with said first coil, a switching means for shutting off the DC current of said first coil while the DC current supplied to said first coil is flowing therethrough, a second coil supplied with a high voltage which is generated when said switching means has made a shut-off action, a second DC current supply means for supplying said second coil with another DC current after the high voltage has been applied to said second coil, and a reverse current blocking means provided between said first coil and second coil for preventing the DC current supplied by said second DC supply means from flowing through said first coil.

2. A high voltage generator according to claim 1, wherein said reverse current blocking means comprises a DC breaker.

3. A high voltage generator according to claim 1, wherein said reverse current blocking means comprises a DC breaker and a diode connected to prevent the DC current supplied by said second DC current supply means from flowing through said first coil.

4. A high voltage generator according to claim 1, wherein said reverse current blocking means comprises a thyristor connected to prevent the DC current supplied by said second DC current supply means from flowing through said first coil.

5. A high voltage generator according to claim 1, wherein said first coil is supplied with a DC current through switches from said first DC current supply means, said switching means is connected in parallel between said switches and a parallel connection of said first coil with said resistor, said switching means is closed to allow a circulating current to flow through said first coil and switching means while the DC current is flowing through said first coil, and the circulating current is shut off by said switching means after said switches have been opened.

6. A high voltage generator according to claim 1, wherein said switching means comprises a circuit breaker provided between said first DC current supply means and a parallel connection of said first coil with said resistor.

* * * * *